Dec. 27, 1927.
A. F. THENER
1,654,021
METHOD OF AND MEANS FOR SLICING TUBULAR ARTICLES
Filed Oct. 25, 1926        2 Sheets-Sheet 1
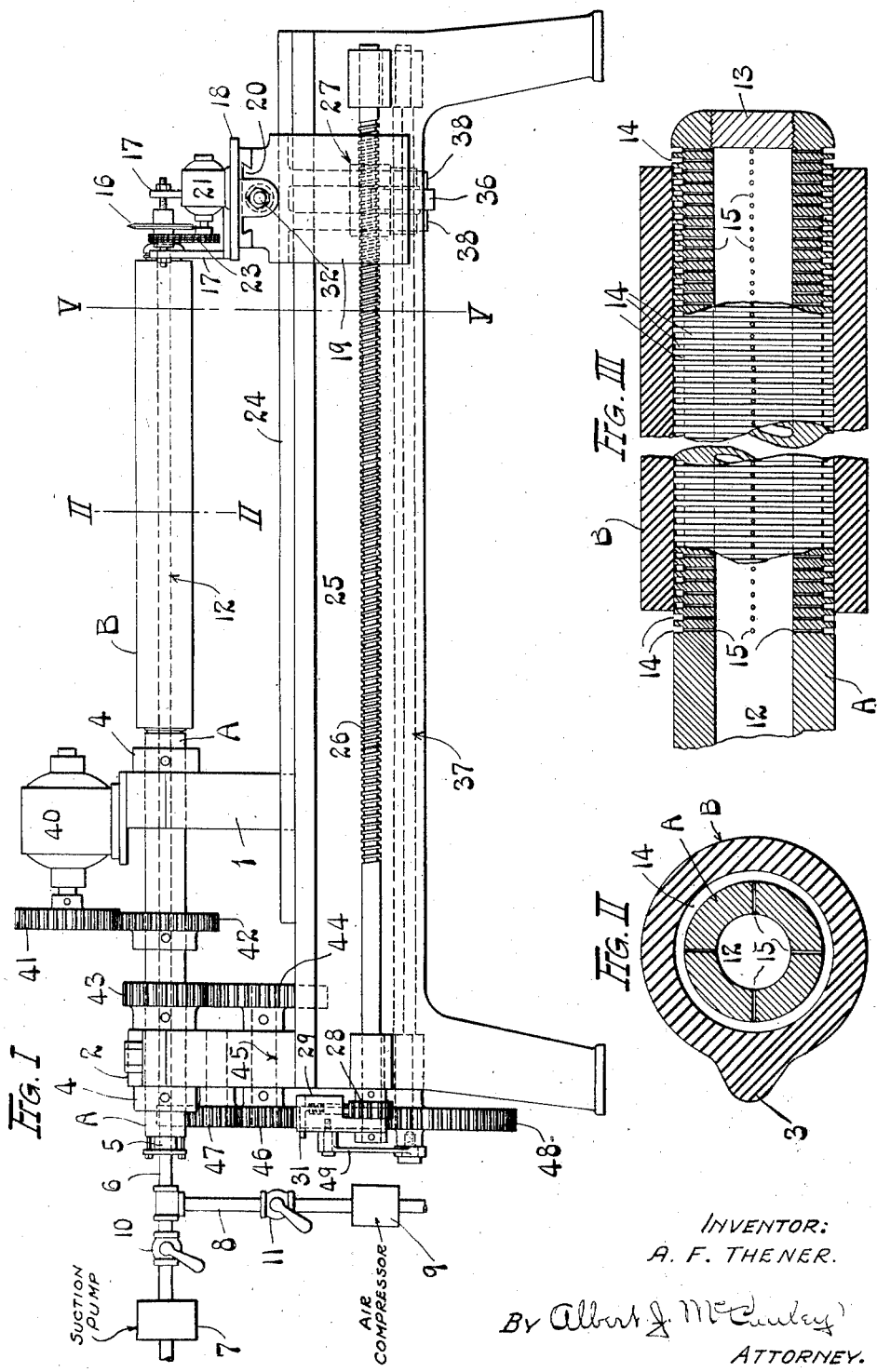
INVENTOR:
A. F. THENER.
By Albert J. McCauley
ATTORNEY.

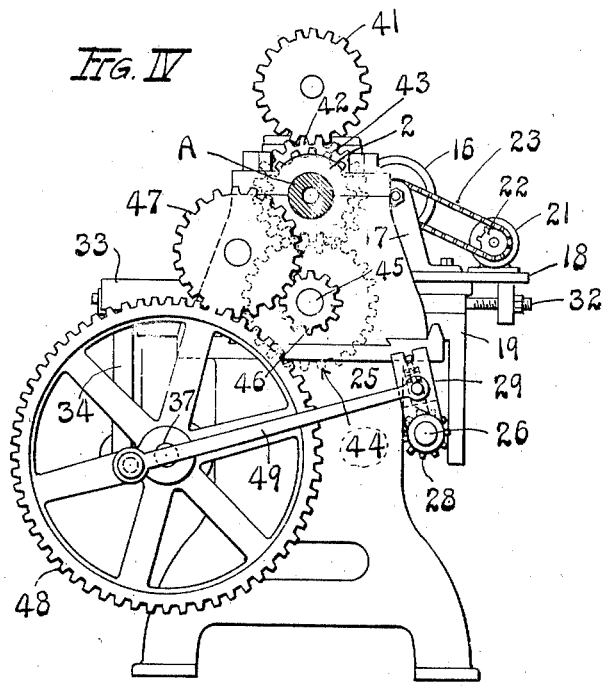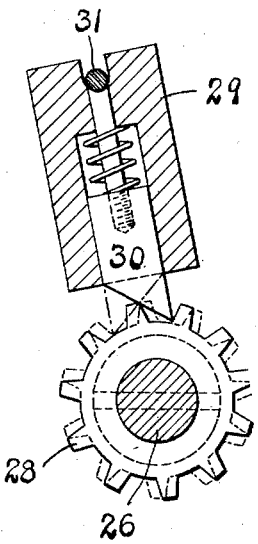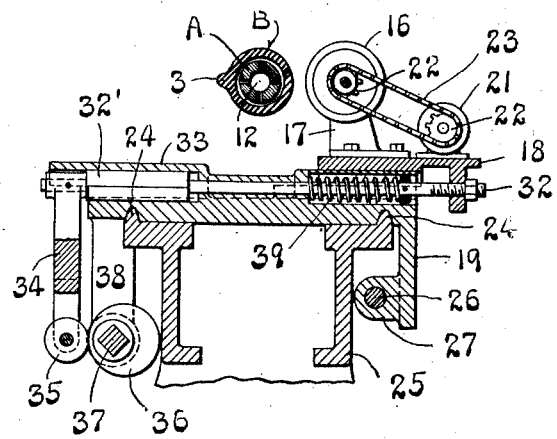

Patented Dec. 27, 1927.

1,654,021

UNITED STATES PATENT OFFICE.

ARTHUR F. THENER, OF ST. LOUIS, MISSOURI, ASSIGNOR TO CUPPLES COMPANY MANUFACTURERS, OF ST. LOUIS, MISSOURI, A CORPORATION OF MISSOURI.

METHOD OF AND MEANS FOR SLICING TUBULAR ARTICLES.

Application filed October 25, 1926. Serial No. 143,828.

This invention relates to a method of and means for slicing tubular articles, and especially to the slicing of flexible tubular articles.

Prior to this invention, cured rubber tubes have been stretched onto a mandrel and held there by friction due to the contraction of the rubber. The mandrel has then been rotated while a knife is used to slice the stretched rubber, thereby forming rubber rings, such as packing rings for fruit jars. In actual practice, this old slicing operation involves the operation of stretching the rubber tube onto the mandrel and the removal of the stretched rings formed by slicing the tube. Furthermore, the rings formed under such conditions are not uniform in thickness.

One of the objects of the present invention is to eliminate the stretching operation, and to more firmly secure the flexible tube on the mandrel. This enables the tube to be more easily placed on the mandrel and also eliminates the difficulty of removing stretched rings. Moreover, since the flexible tube is very securely held and substantially free of tension, the slices are accurately formed to produce uniform rings, of a predetermined thickness.

In carrying out the old method in which the rubber tube was stretched onto a mandrel, it was customary to use mandrels made of wood or rubber, and to force the knife into the mandrel at the end of each slicing operation. This rapidly destroyed the mandrels requiring them to be renewed after a brief period of service. In carrying out the present invention, a mandrel made of metal or other substantially indestructible material may be provided with annular circumferential grooves to receive the knife, for it is not necessary to stretch the tube onto the mandrel and the grooving will not interfere with the operations of mounting the tube and removing the slices.

With the foregoing and other objects in view, the invention comprises the novel method, construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Briefly stated, the apparatus herein described includes a mandrel on which the flexible tube is placed and then held by suction which causes the inner face of the tube to very firmly engage the outer face of the mandrel. While the tube is thus sucked onto the mandrel, it is acted upon by a knife with a cutting edge which passes through the tube and enters into annular grooves in the mandrel. The knife is advanced step by step to slice the tube, and upon the completion of the slicing operations, the suction is relieved and air under pressure is forced into the annular grooves to release the slices from the mandrel. Since the slices are not under tension, they can then be easily and quickly removed from the mandrel.

In the old method referred to, uncured rubber tubes could not be sliced, for the raw rubber is not very elastic and cannot be held by contraction on the mandrel. Furthermore, the centrifugal force resulting from the rapid rotation of the mandrel would instantly distort and loosen the raw rubber tube. However, in carrying out the present invention wherein the tube is sucked onto the mandrel, the desired results can be obtained in slicing either raw or cured rubber, as well as various other materials that could not be sliced in following the old practice.

Fig. I is a front elevation of an apparatus embodying the features of this invention.

Fig. II is a section on a larger scale, taken on the line II—II in Fig. I, and showing a rubber tube surrounding a mandrel on which the tube is to be sliced.

Fig. III is a fragmentary longitudinal section, partly in elevation, showing the mandrel and the tube mounted thereon.

Fig. IV is an end view of the apparatus, the mandrel being shown in section.

Fig. V is a section on the line V—V in Fig. I.

Fig. VI is an enlarged detail view showing the reversible pawl through which motion is transmitted to the knife carriage.

A designates a hollow mandrel rotatably mounted in bearings 1 and 2, and extending from the bearing 1 to receive the article to be sliced. The article shown is a flexible tube B, such as a rubber tube having a longitudinal rib 3 (Fig. II) and adapted to be cut into slices to form fruit jar rings with extended lips produced by the rib 3.

To prevent longitudinal displacement of the mandrel it is provided with collars 4 engaging the bearings 1 and 2. The mandrel extends from the bearing 2, as shown in Fig. I, and its extended portion is provided with a stuffing box 5 to receive a pipe 6 leading to a suction pump 7. A branch 8 of the pipe 6 leads to an air compressor 9. These pipes are provided with valves 10 and 11.

The mandrel A has a longitudinal passageway 12 (Figs. I, II and III) communicating at one end with the pipe 6, the opposite end of said passageway being closed by a plug 13 shown in Fig. III. The mandrel is also provided with annular grooves 14 in its peripheral face and restricted ports 15 leading from the passageway 12 to said grooves.

The inner face of the rubber tube B contacts with the outer face of the mandrel A but it is not necessary to stretch the tube onto the mandrel. During the slicing operation, which will be hereafter described, the valve 10 is opened to create a partial vacuum in the pipe 6 and consequently in the passageway 12 in the mandrel, as well as in the annular grooves 14 surrounded by the flexible tube B. This sucks the tube onto the mandrel and securely holds the tube to prevent displacement while the mandrel is rotated at a high speed. This suction is maintained throughout the slicing operation in which a knife is moved step by step and forced through the rotating tube. The cutting edge of the knife enters into each of the successive grooves 14 so as to divide the tube into thin slices adapted for use as fruit jar rings. At the end of the slicing operation, the valve 10 is closed to relieve the vacuum, and the valve 11 is opened to admit air under pressure into the mandrel, thus releasing the slices and allowing them to be easily removed from the mandrel.

While it is desirable to have the tube B cover all of the circumferential grooves in the mandrel, this is not absolutely necessary, for the air ports 15 are preferably so small that the leakage through them will not release the tube from the mandrel.

This method of securely holding the tube by suction during the slicing operation has the advantage of preventing displacement of the tube on the mandrel, so as to produce smooth and uniform slices, at the same time eliminating the difficulties and inaccuracies heretofore incurred by stretching the tube onto the mandrel. In the old method, centrifugal force was a disturbing factor, especially in slicing a tube with a projecting rib as shown at 3 in Fig. II, the tube being rotated at a very high speed tending to loosen the relatively thick portion at the rib. The suction method herein disclosed holds the irregular tube so firmly that there is no material displacement or creepage of the tube during the numerous cutting operations.

The knife herein shown is in the form of a disk 16 having a peripheral cutting edge. It is rotatably supported by standards 17 extending upwardly from a plate 18 adapted to reciprocate on the top of a carriage 19, the latter having a dovetail 20 (Fig. I) to guide the plate 18. This plate supports an electric motor 21 which transmits a rotary motion to the knife 16 as shown most clearly in Fig. V, the motor and knife being provided with sprocket wheels 22 which receive a sprocket chain 23.

The carriage 19 is movable in a line parallel with the mandrel A and it is guided by means of ribs 24 on a bed 25. The means for imparting a step by step movement to the carriage 19 comprises a screw 26 passing through a nut member 27 (Figs. I and V) which forms part of the carriage, a toothed wheel 28 fixed to said screw, and a pawl carrier 29 adapted to oscillate on the unthreaded end of said screw. The oscillatory pawl carrier 29 contains a spring pressed pawl 30 (Fig. VI) engaging the toothed wheel 28 and provided with a reversing handle 31 to shift the pawl from the position shown by full lines in Fig. VI to the position shown by dotted lines.

When the pawl carrier 29 is oscillated, an intermittent rotary motion will be imparted to the feed screw 26, so as to move the knife holder step by step in a line parallel with the mandrel A, the length of each step being equal to the distance from the center of one annular groove 14 to the center of the next adjacent groove. When the knife is carried to one of its extreme positions, the pawl 30 can be reversed to feed the carriage in the opposite direction.

The means for forcing the knife through the rubber tube B is shown most clearly in Figs. I and V. It comprises a rod 32 fixed to the slidable plate 18 which supports the knife, said rod having a non-circular portion 32' adapted to slide in a guide 33 and an arm 34 equipped with a roller 35 engaging an eccentric 36 which slides on a square shaft 37. The eccentric 36 is confined between a pair of arms 38 so as to travel with the carriage 19. The function of the eccentric is to force the knife 16 through the tube to be sliced, and this is accomplished by shifting the plate 18 on the carriage 19. This plate and the knife supported thereon are returned by means of a spring 39 (Fig. V) interposed between a collar on the rod 32 and a shoulder in the carriage 19.

The driving mechanism comprises a motor 40 (Fig. I) provided with a gear wheel 41 meshing with a gear wheel 42 on the mandrel A so as to rotate the mandrel and the tube mounted thereon.

The means for transmitting power from the mandrel to the shaft 37 comprises a gear wheel 43 on the mandrel meshing with a gear 44 on a shaft 45 provided with a pinion 46 which meshes with a gear 47, the latter being in mesh with a large gear 48 fixed to one end of the shaft 37.

The means for oscillating the pawl carrier 29 comprises a connecting rod 49 pivoted at one end to the wheel 48 and at the other end to the pawl carrier, as shown in Figs. I and IV.

The driving mechanism advances the carriage 19 step by step to locate the knife 16 opposite to each of the grooves 14 in the mandrel, and when the knife is thus alined with a groove, the plate 18 is shifted to force the cutting edge through the tube B and into the groove.

I claim:

1. In an apparatus for slicing tubular articles, a mandrel adapted to lie within the articles so as to contact with the inner face thereof, means for rotating the mandrel, means whereby the article is sucked onto the outer face of the rotating mandrel, and a slicing device cooperating with said mandrel to slice the tubular articles.

2. In an apparatus for slicing tubular articles, a mandrel adapted to lie within the tubular articles so as to contact with the inner face thereof, said mandrel having annular grooves in its outer face, and a knife movable into said annular grooves to slice the tubular articles.

3. In an apparatus for slicing tubular rubber articles, a mandrel adapted to lie within the tubular articles so as to contact with the inner face thereof, said mandrel having annular grooves in its outer face, an air passageway and restricted air ports leading from said passageway to said grooves, a suction device communicating with said passageway to suck the tubular rubber articles onto the mandrel, means for rotating the mandrel, a knife, and means whereby said knife is forced into said annular grooves.

4. The method of making rubber rings which comprises placing a flexible rubber tube around a mandrel, rotating the mandrel and at the same time sucking the flexible tube onto the outer face of said mandrel, and forming flexible slices by moving a rotating knife into and out of contact with said rubber tube while the slices and the remaining portion of the tube are sucked onto the rotating mandrel.

5. The method of making jar rings which comprises placing a flexible rubber tube around a mandrel having annular grooves in its outer face, rotating the mandrel and at the same time creating a partial vacuum in the annular grooves to suck the rubber tube onto the mandrel, and converting said rubber tube into flexible slices by forcing a knife through the rubber tube and into the annular grooves while the slices and the remaining portion of the tube are sucked onto the rotating mandrel.

In testimony that I claim the foregoing I hereunto affix my signature.

ARTHUR F. THENER.